US012453455B2

(12) United States Patent
Yaacov

(10) Patent No.: US 12,453,455 B2
(45) Date of Patent: Oct. 28, 2025

(54) SOLUBLE DETERGENT UNIT

(71) Applicant: STEROKEM LTD., Haifa (IL)

(72) Inventor: Shai Yaacov, Givat Ella (IL)

(73) Assignee: Sterokem LTD, Haifa (IL)

( * ) Notice: Subject to any disclaimer, the term of this patent is extended or adjusted under 35 U.S.C. 154(b) by 0 days.

(21) Appl. No.: 18/572,058

(22) PCT Filed: Dec. 15, 2022

(86) PCT No.: PCT/IL2022/051336
§ 371 (c)(1),
(2) Date: Dec. 19, 2023

(87) PCT Pub. No.: WO2023/126913
PCT Pub. Date: Jul. 6, 2023

(65) Prior Publication Data

US 2024/0260808 A1 Aug. 8, 2024

(30) Foreign Application Priority Data

Dec. 29, 2021 (IL) ........................................ 289486

(51) Int. Cl.
*C11D 17/04* (2006.01)
*A47L 15/44* (2006.01)

(52) U.S. Cl.
CPC ........ *A47L 15/4436* (2013.01); *C11D 17/046* (2013.01); *C11D 2111/14* (2024.01)

(58) Field of Classification Search
None
See application file for complete search history.

(56) References Cited

U.S. PATENT DOCUMENTS

2007/0232517 A1* 10/2007 Evans ...................... C11D 3/42 510/445
2008/0214424 A1 9/2008 Barnwell et al.
2009/0004234 A1* 1/2009 Kessler ................. D06F 39/024 424/409
2015/0072915 A1* 3/2015 Dreher ................. C11D 17/041 156/252
2018/0312787 A1* 11/2018 Gelderman .............. C11D 7/12

FOREIGN PATENT DOCUMENTS

CA 1319466 C 6/1993
CA 2313587 A1 1/2001
GB 2400608 A * 10/2004 ......... A47L 15/4472
WO WO-2017029371 A1 * 2/2017 ............ B65D 65/46

* cited by examiner

*Primary Examiner* — Lorna M Douyon
(74) *Attorney, Agent, or Firm* — Seed Intellectual Property Law Group LLP

(57) ABSTRACT

A soluble detergent unit comprising a floatable and substantially hollow container adapted to accommodate a desired volume of one or more portions of a soluble substance, at least one of which is a soluble detergent, wherein the floatable and substantially hollow container is configured to allow a predetermined contact between the soluble detergent and the surrounding water, thereby enabling the gradual release of soluble detergent to the water at a predetermined rate, and wherein the soluble detergent unit is adapted to initially submerge in water, and to float towards the water level along with the gradual release of soluble detergent to the water.

10 Claims, 4 Drawing Sheets

SOLUBLE DETERGENT UNIT

FIELD OF THE INVENTION

The present invention is in the field of cleaning substances. More specifically, the invention relates to a soluble detergent unit for industrial dishwashers.

BACKGROUND OF THE INVENTION

Industrial dishwashers are essential equipment for enabling high-volume organizational and industrial kitchens, such as restaurants, to serve high volumes of people while using a predetermined limited number of dining sets.

The operation of industrial dishwashers includes cycling a predetermined volume of water stored in a reservoir and applied onto the washed dishes, while a cleaning agent in the form of liquid/gel/powder/tablet is added to the water.

Many industrial dishwashers employ ancillary electric detergent dispensers for controllably adding detergents to the dishwasher water reservoir. Unfortunately, the existing detergent dispensers require professional installation and maintenance, incurring significant purchase and service costs.

The incurred costs can be reduced by manually adding detergent powders or tablets. However, existing detergent powders/tablets provide the dishwasher user with no indication of when the added powders/tablets deplete, which is commonly detected when washed dishes that finish a washing cycle remain dirty. This results in wasted water, electricity, and time.

Therefore, it is an object of the present invention to provide a soluble detergent unit, which indicates detergent depletion before its concentration in the water degrades.

Other objects and advantages of the invention will become apparent as the description proceeds.

SUMMARY OF THE INVENTION

The invention relates to a soluble detergent unit that comprises a floatable and substantially hollow container adapted to accommodate a desired volume of one or more portions of a soluble substance, at least one of which is a soluble detergent, wherein said floatable and substantially hollow container is configured to allow a predetermined contact between the soluble detergent and the surrounding water, thereby enabling the gradual release of soluble detergent to the water at a predetermined rate, and wherein said soluble detergent unit is adapted to initially submerge in water, and to float towards the water level along with the gradual release of soluble detergent to the water. Thereby providing the dishwasher users with an early indication—before the detergent concentration in the water deteriorates.

According to an embodiment of the invention, the floatable and substantially hollow container is substantially cylindrical.

According to an embodiment of the invention, the floatable and substantially hollow container comprises one or more inwardly extending protrusions.

According to an embodiment of the invention, the floatable and substantially hollow container is made of reusable materials.

According to an embodiment of the invention, the floatable and substantially hollow container adapted with a well notable color.

According to an embodiment of the invention, the floatable and substantially hollow container is shaped like a cup.

According to an embodiment of the invention, the floatable and substantially hollow container comprises lateral apertures.

According to an embodiment of the invention, the floatable and substantially hollow container is partitioned.

According to an embodiment of the invention, the floatable and substantially hollow container comprises one or more cylindrical partitions.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

A DETAILED DESCRIPTION OF EMBODIMENTS OF THE INVENTION

The present invention relates to a soluble detergent unit intended for placement in an industrial dishwasher's water reservoir to gradually release detergent agents to the surrounding water in a controllable manner, such as to maintain a predetermined detergent concentration in the water.

The proposed soluble detergent unit is adapted to submerge in water initially, then to gradually float along with the gradual release of detergent into the water, such as to be notable near/at the water level—as the detergent depletes (i.e., when no further detergent can be released to the water), thereby to provide the users of the dishwasher with an early indication—before the detergent concentration in the water deteriorates.

In the following detailed description, references are made to several embodiments of the present invention, examples of which are illustrated in the accompanying figures. The figures depict embodiments of the present invention for purposes of illustration only. One skilled in the art will readily recognize from the following description that the described embodiments may be combined, alternative embodiments may be utilized, and other changes may be made without departing from the spirit or scope of the present invention described herein.

The terms "for example", "e.g.", and "optionally", as used herein, are intended to be used to introduce non-limiting examples. While certain references are made to certain example configurations/combinations of elements, other configurations/combinations can also be used. Furthermore, the example elements may be combined into fewer components and/or divided into further components.

Figure 1A:
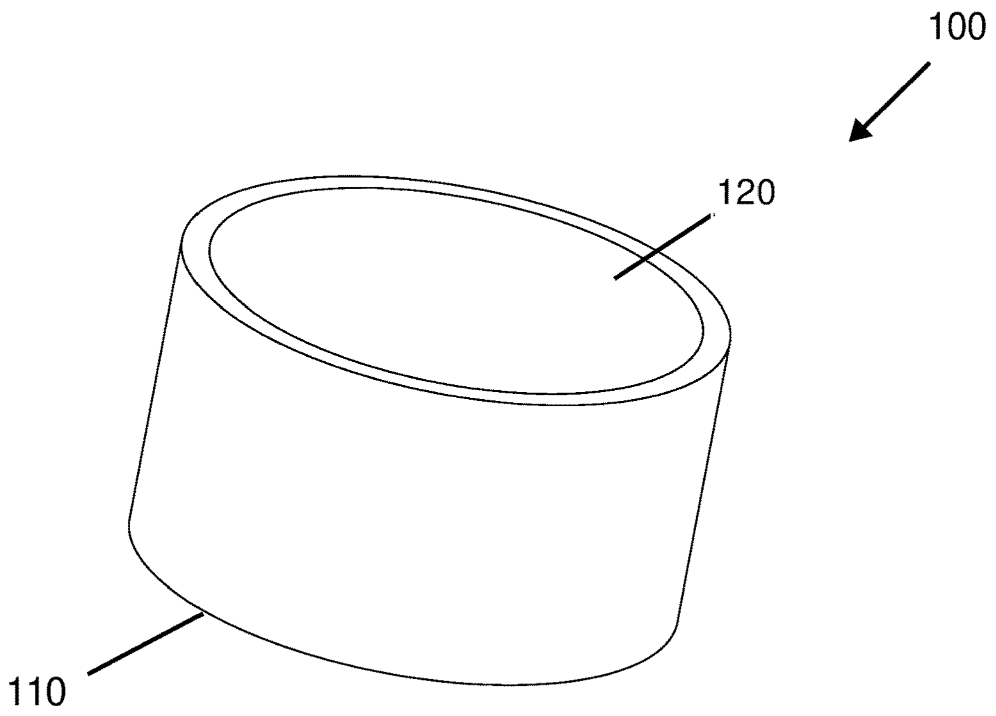
FIGS. 1A-1B schematically illustrate perspective and cross-section views of a soluble detergent unit, according to an embodiment of the present invention.
Figure 1B:
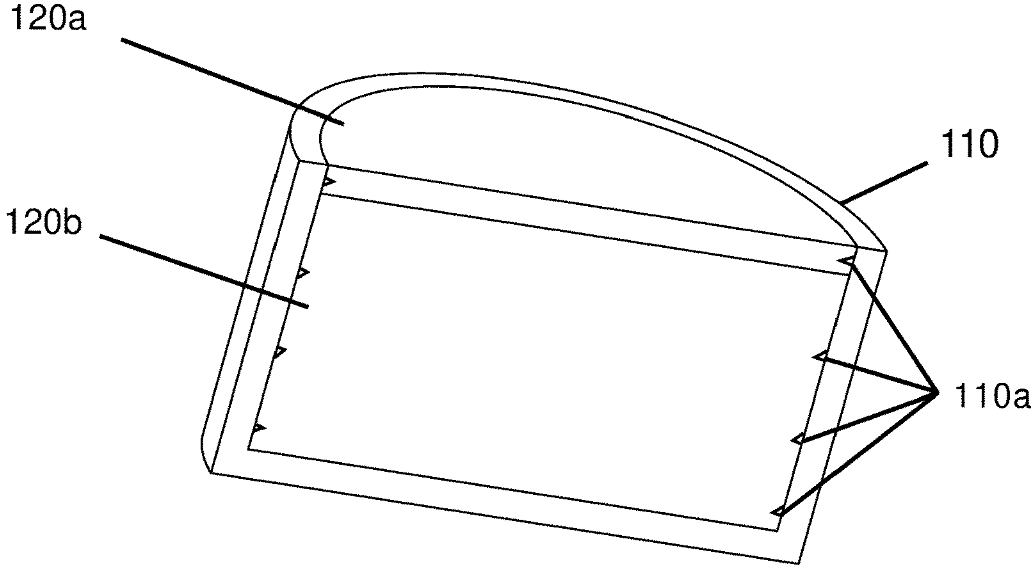

FIGS. 1A-1B schematically illustrate perspective and cross-section views of a soluble detergent unit 100, according to an embodiment of the present invention. Soluble detergent unit 100 comprises a floatable and substantially hollow container such as floatable cup 110, which is adapted to accommodate the desired volume of soluble detergent 120, while allowing a predetermined contact between the soluble detergent and the surrounding water, thereby enabling releasing soluble detergent 120 to the water gradually (e.g., within a dishwasher water tank) at a predetermined dissolving rate. Floatable cup 110 may further comprise one or more inwardly extending protrusions 110*a* for maintaining firm contact with detergent 120, thus, the integrity of unit 100.

The dissolving rate of detergent 120 is derived from its chemical properties and its overall contact area with the surrounding water. For example, whereas the floatable cup 110 is water-resistant, the contact area of detergent 120 with the surrounding water is determined by the internal diameter of the floatable cup 110.

The average specific weight of floatable cup 110 with soluble detergent 120 is initially higher than the specific weight of water. When unit 100 is placed in a water reservoir, it submerges. Nevertheless, floatable cup 110 is formed with a lower specific weight than the specific weight of water (e.g., comprising a plastic comprising air bubbles) to enable the gradual floating of unit 100 along with the gradual release of soluble detergent 120. According to an embodiment of the present invention, cup 110 is adapted with a notable color (e.g., obtained by added bright color paint and/or by the color of the comprising detergent compound) to ensure notable visibility of unit 100.

Of course, multiple different materials may be selected by one skilled in the art for fabricating floatable cup 110 with a specific weight lower than the specific water weight. For instance, floatable cup 110 may be reusable (i.e., can be recollected, cleaned, and refilled) and/or made of reusable materials such as reusable polymers.

Detergent 120 is a compound of one or more soluble substances (e.g., alkali agents that breaks into soluble powder in water) at a predetermined dissolving rate in water, for enduring a predetermined number of cleaning cycles, at a given water volume and suitability for desired cleaning intensity (e.g., alternate subtypes of unit 100 may be provided for different grades of water volumes and required cleaning intensity, hence, can be selected by users in accordance with a specific combination of a dishwasher, dishes type and dirt to be cleaned (e.g., specific food types served in a particular restaurant that leaves food residues of specific persistency).

Detergent 120 may comprise two or more portions 120*a* and 120*b* (FIG. 1B) of soluble detergents, each of which has different characteristics. For example, portion 120*a* may be a booster portion of a higher dissolving rate than portion 120*b*, such as to enable a faster detergent release rate, thereby shortly (e.g., within a few seconds) reaching a proper detergent concentration in a new volume of added water (e.g., for the first cleaning cycle in a restaurant's shift).

Figure 2:
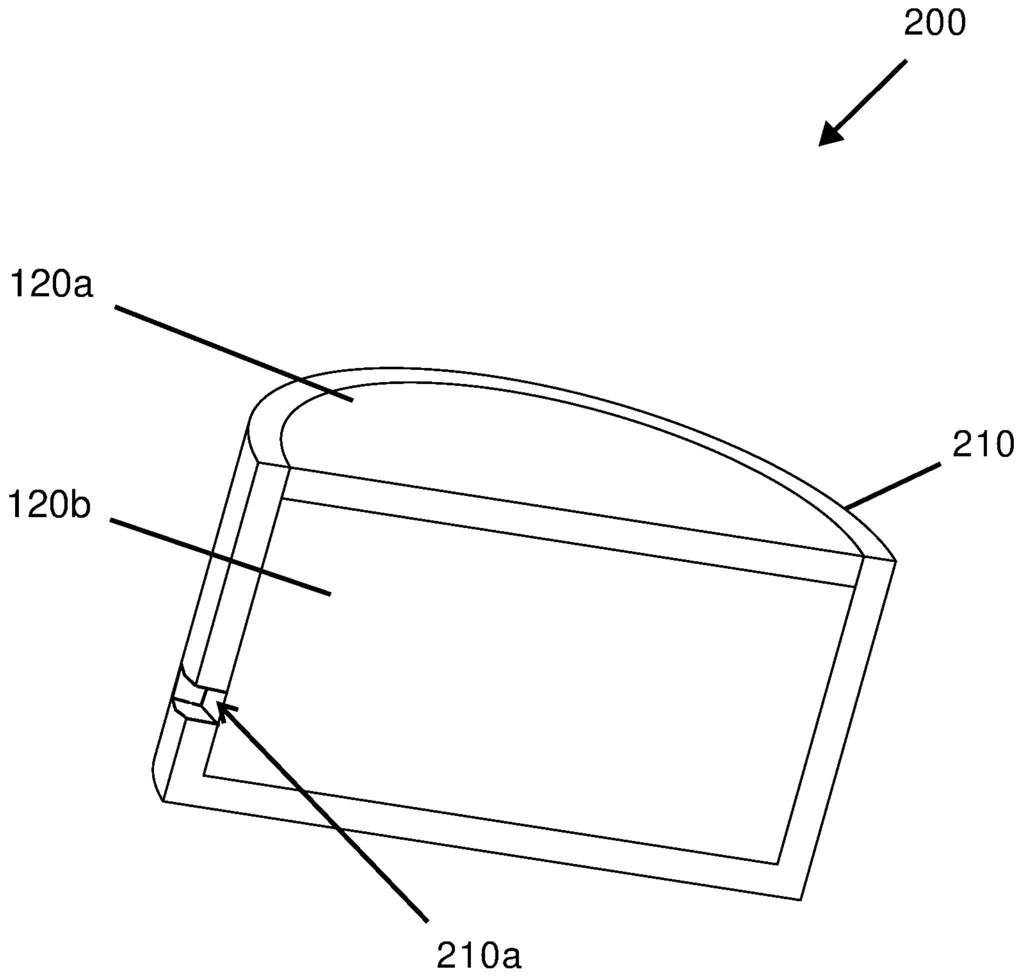
FIG. 2 schematically illustrates a cross-section view of a soluble detergent unit having a floatable cup with one or more lateral release apertures, according to an embodiment of the present invention.

FIG. 2 schematically illustrates a cross-section view of a soluble detergent unit 200 having a floatable cup 210 with one or more lateral release apertures 210*a*, according to an embodiment of the present invention. Lateral apertures 210*a* (a single aperture illustrated in FIG. 2) enable simultaneous release of matter from portions 120*a* and 120*b*, to obtain a desired mixture of dissolved substances from portions 120*a* and 120*b* in the water.

Figure 3:
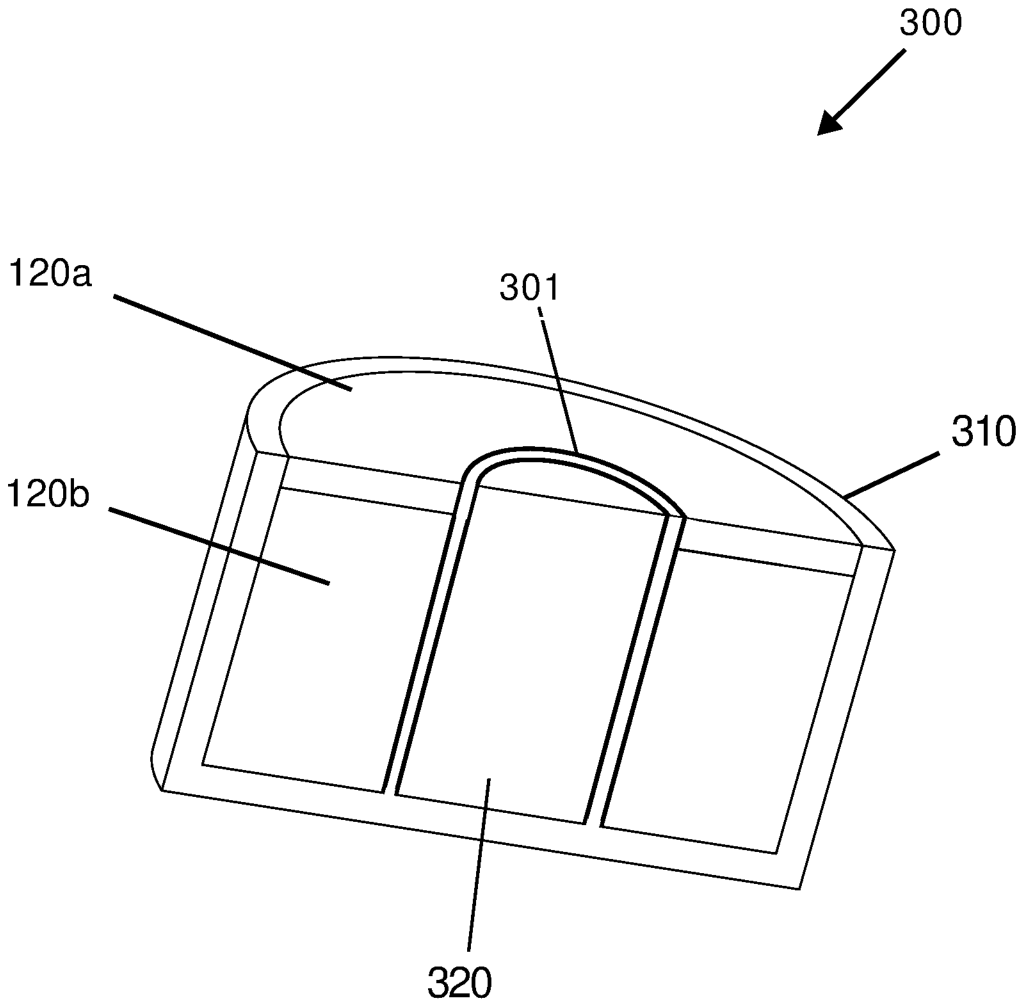
FIG. 3 schematically illustrates a cross-section view of a cylindrically partitioned soluble detergent unit, according to an embodiment of the present invention.
Figure 4:
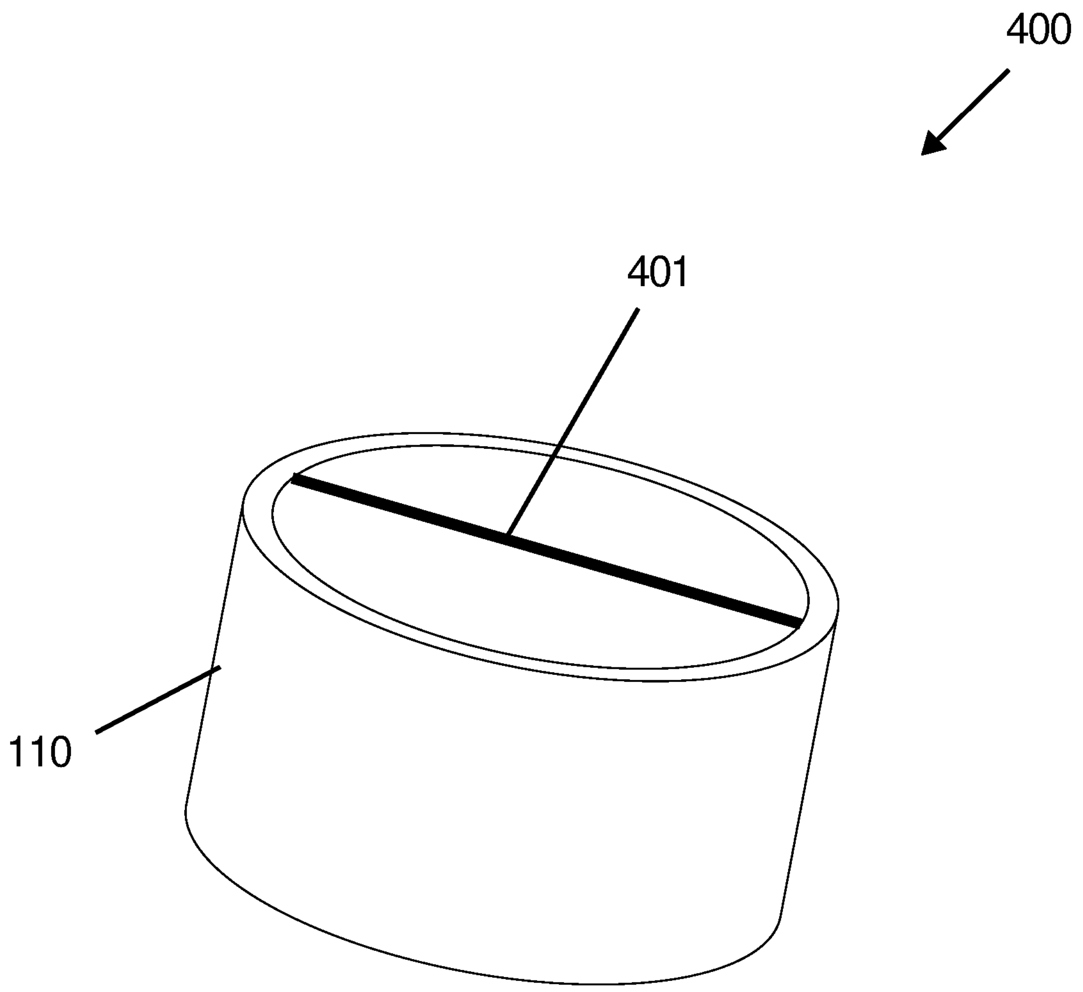
FIG. 4 schematically illustrates another configuration of a soluble detergent unit having a mediating partition, according to an embodiment of the present invention.

According to some embodiments of the invention, a mixture of dissolved detergents is obtained by utilizing partitioned configurations of soluble detergent unit 100 or 200, such as by using a partitioned floatable container, as illustrated in FIGS. 3 and 4.

Floatable cup 310 of soluble detergent unit 300 (FIG. 3) is cylindrically partitioned by partition 301, thus facilitating a gradual release of a soluble substance 320. The dissolving rate of soluble substance 320, as well as its relative quantity in the mixture of substances released to the water (i.e., with respect to the released substance of portion 120*a* or 120*b*), are determined by its chemical properties, the size and shape of partition 301 and the relative proportions of partition 301 and cup 310.

Another partitioned configuration is soluble detergent unit 400 of FIG. 4, which comprises a mediating partition 401, thus enabling the simultaneous release of two substances into the water.

One skilled in the art will readily realize numerous alternate shapes and dimensions of partitions 301 and 401, resulting in desired relative volumes of the partitioned portions, as well as combinations of multiple cylindrical and/or mediating partitions, to facilitate a gradual release of two or more detergents and/or other substances to the water.

Furthermore, while embodiments of the proposed soluble detergent unit are described hereinabove, and illustrated in the corresponding figures as having a substantially cylindrical shape and specific proportions, alternate shapes and configurations may be selected by one skilled in the art for specific implementations.

Although embodiments of the invention have been described by way of illustration, it will be understood that the invention may be carried out with many variations, modifications, and adaptations, without exceeding the scope of the claims.

The invention claimed is:

1. A detergent unit for providing a visual indication of detergent depletion in an industrial dishwasher, comprising:
a floatable and hollow container adapted to accommodate a volume of a soluble detergent, wherein said detergent unit is configured to initially submerge in water and to gradually float or rise toward the water level as the soluble detergent dissolves,
- wherein the container is formed from materials having a specific weight lower than that of water,
- wherein the soluble detergent comprises at least two portions, a first portion having a faster dissolving rate than a second portion,
- wherein the soluble detergent comprises only water soluble substances, and
- wherein the rising of the container toward the water surface serves as a visual indication that the soluble detergent is nearing depletion.

2. A detergent unit according to claim 1, wherein the floatable and hollow container is cylindrical.

3. A detergent unit according to claim 1, wherein the floatable and hollow container comprises one or more inwardly extending protrusions provided within the hollow container to maintain firm contact with the soluble detergent and preserve the integrity of the detergent unit.

4. A detergent unit according to claim 1, wherein the floatable and hollow container is made of reusable materials.

5. A detergent unit according to claim 1, wherein the floatable and hollow container is configured to ensure notable visibility of the container within the industrial dishwasher's water reservoir.

6. A detergent unit according to claim 1, wherein the floatable and hollow container is configured as a floatable cup adapted to submerge in water initially and gradually float along with the release of the soluble detergent into the water.

7. A detergent unit according to claim 1, wherein the floatable and hollow container comprises lateral apertures.

8. A detergent unit according to claim 1, wherein the floatable and hollow container is partitioned.

9. A detergent unit according to claim 8, wherein the floatable and hollow container comprises one or more cylindrical partitions.

10. A detergent unit according to claim 8, wherein the floatable and hollow container comprises one or more mediating partitions.

* * * * *